United States Patent
Cheong et al.

[11] Patent Number: 5,996,085
[45] Date of Patent: Nov. 30, 1999

[54] CONCURRENT EXECUTION OF MACHINE CONTEXT SYNCHRONIZATION OPERATIONS AND NON-INTERRUPTIBLE INSTRUCTIONS

[75] Inventors: Hoichi Cheong; Hung Qui Le, both of Austin, Tex.

[73] Assignee: International Business Machines Corporation, Armonk, N.Y.

[21] Appl. No.: 08/893,070

[22] Filed: Jul. 15, 1997

[51] Int. Cl.[6] .................................................. G06F 9/38

[52] U.S. Cl. ............................................... 713/400

[58] Field of Search .................................. 395/381, 382, 395/551, 559, 569; 712/205, 66, 228; 713/400, 600

[56] References Cited

U.S. PATENT DOCUMENTS

| | | |
|---|---|---|
| 5,542,058 | 7/1996 | Brown, III et al. ................... 395/557 |
| 5,764,969 | 6/1998 | Kahle et al. ............................ 395/569 |
| 5,790,843 | 8/1998 | Borkenhagen et al. ............... 395/567 |

*Primary Examiner*—Thomas M. Heckler
*Attorney, Agent, or Firm*—Kelly K. Kordzik; Winstead Sechrest & Minick P.C.; Anthony V.S. England

[57] ABSTRACT

Within a superscalar processor implementing parallel processing of instructions, machine context synchronization operations, which may alter the context or state of the processor, are allowed to be executed in parallel with non-interruptible instructions under certain conditions. Such a condition includes the absence of a side effect of the change of context resulting from the machine context synchronization operations on the non-interruptible instructions.

24 Claims, 6 Drawing Sheets

CONCURRENT EXECUTION OF MACHINE CONTEXT SYNCHRONIZATION OPERATIONS AND NON-INTERRUPTIBLE INSTRUCTIONS

CROSS-REFERENCE TO RELATED APPLICATIONS

This patent application is related to the following:

U.S. patent application Ser. No. 08/761,875, filed Dec. 9, 1996, titled "INSTRUCTION DISPATCH UNIT AND METHOD FOR DYNAMICALLY CLASSIFYING AND ISSUING INSTRUCTIONS OUT-OF-ORDER", now U.S. Pat. No. 5,864,341.

U.S. patent application Ser. No. 08/827,076 (Attorney Docket No. AT9-97-076), filed Mar. 26, 1997, titled "DYNAMIC PAIRING OF INSTRUCTIONS"; and U.S. patent application Ser. No. 08/829,669 (Attorney Docket No. AT9-97-075), titled "SUPPORT FOR OUT-OF-ORDER EXECUTION OF LOADS AND STORES IN A PROCESSOR";

all of which are hereby incorporated by reference herein.

TECHNICAL FIELD

The present invention relates in general to data processing systems, and in particular, to the concurrent execution of machine context synchronization operations and non-interruptible instructions within a superscalar processor.

BACKGROUND INFORMATION

Superscalar processors that operate under an out-of-order execution model have improved their performance by allowing instructions to execute in parallel. Most instructions with no write-read dependents can be executed without obeying the order in which they are dispatched. With multiple functional units in a superscalar processor, out-of-order execution has increased the number of instructions processed per unit cycle. However, there are instructions and event handling operations in the processor that have not taken advantage of the out-of-order execution model. Most of the "context synchronizing" instructions ("CSI") and interrupts fall into this category. For example, for the processor to enter an interrupt service routine, the current approach is to wait for completion of all instructions dispatched prior to the subroutine entry. Likewise, the same approach applies to MTSPR (move to special register) instructions that modify special purpose registers, SC (system call) instructions that handle system calls, MTMSR (move to machine state register) instructions that modify the machine status, RFI (return from interrupt) instructions that are executed when an interrupt service routine ends, and ISYNC (instruction synchronization) instructions.

Traditional implementations wait for all prior dispatch instructions to complete before starting to execute the above-noted instructions or to process the events. The reason for the traditional implementation is partly due to the architecture definition and the current state of art in handling instruction completion. The architecture definition requires a CSI or event to begin after prior instructions "appear" to have completed. All exceptions generated by these prior instructions have to be handled before the start of a CSI. In the current implementation of various PowerPC processors that support out-of-order executions, all instructions dispatched are saved in a "completion buffer" which is a first-in-first-out buffer, and the completion of an instruction in the instruction buffer requires the result (if there is one) of the instruction to be deposited in the target register or sent to the memory subsystem, and the instruction does not generate an exception. For these reasons, the current implementation of CSI instructions and events holds off the start of these instructions or events until all prior instructions in the completion buffer have actually completed.

As a result of the foregoing, there is a need in the art for an improved implementation of instruction completion handling wherein CSI instructions and interrupt events are allowed to begin before all prior instructions have deposited their result in the target registers. By doing so, the processor will be allowed to increase its degree of concurrent execution of instructions.

SUMMARY OF THE INVENTION

The present invention addresses the foregoing need by providing a system and method for executing machine context synchronization operations concurrently with non-interruptible instructions. Such non-interruptible instructions may be logically prior to the machine context synchronization operations.

The present invention further determines whether or not there are any other machine context synchronization operations logically prior to the machine context synchronization operation at issue, and ensures that those operations are completed prior to executing the present machine context synchronization operation.

Machine context synchronization operations are required in instruction-based interrupts, non-instruction-based interrupts, CSI instructions, ISYNC instructions, return from interrupt instructions, and instructions dealing with writing to special purpose registers.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
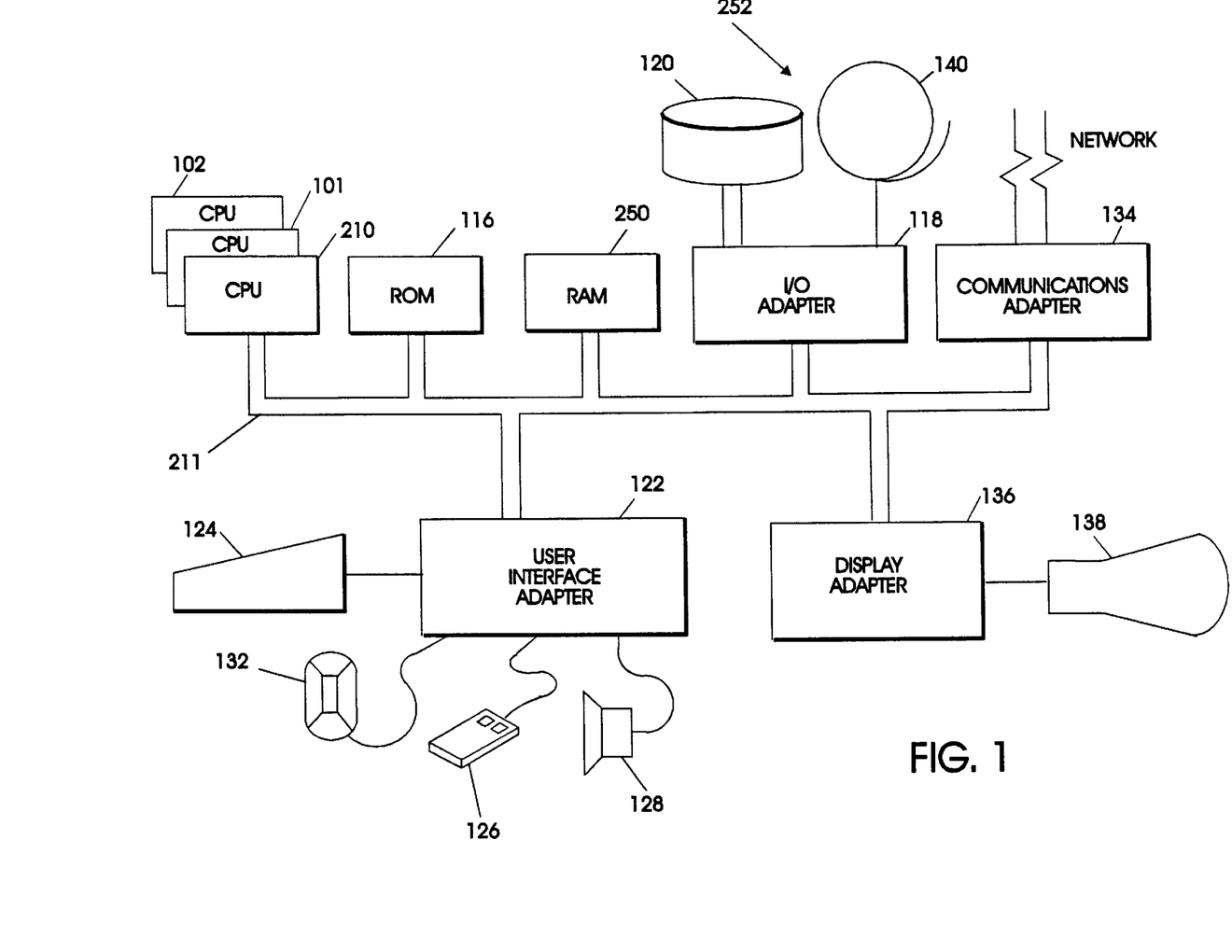
FIG. 1 illustrates a data processing system configurable in accordance with the present invention.

Referring first to FIG. 1, an example is shown of a data processing system configurable in accordance with the present invention. The system has a central processing unit ("CPU") 210, such as a PowerPC microprocessor ("PowerPC" is a trademark of IBM Corporation) according to the *"PowerPC Architecture: A Specification for a New Family of RISC Processors,"* 2d edition, 1994, Cathy May, et al. Ed., which is hereby incorporated by reference herein. A more specific implementation of a PowerPC microprocessor is described in the *"PowerPC 604 RISC Microprocessor User's Manual,"* 1994, IBM Corporation, which is hereby incorporated by reference herein.

The CPU 210 is coupled to various other components by system bus 211. Read only memory ("ROM") 116 is coupled to the system bus 211 and includes a basic input/output system ("BIOS"), which controls certain basic functions of the data processing system. Random access memory ("RAM") 250, I/O adapter 118, and communications adapter 134 are also coupled to the system bus 211. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252. Communications adapter 134 interconnects bus 211 with an outside network enabling the data processing system to communicate with other such systems. Input/output devices are also connected to system bus 211 via user interface adapter 122 and display adapter 136. Keyboard 124, trackball 132, mouse 126, and speaker 128 are all interconnected to bus 211 via user interface adapter 122. Display monitor 138 is connected to system bus 211 by display adapter 136. In this manner, a user is capable of inputting to the system through the keyboard 124, trackball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

It should be noted that the data processing system configured in accordance with the present invention may be a multi-processing system including processors 101 and 102, in addition to processor 210, coupled to system bus 211.

Figure 2:
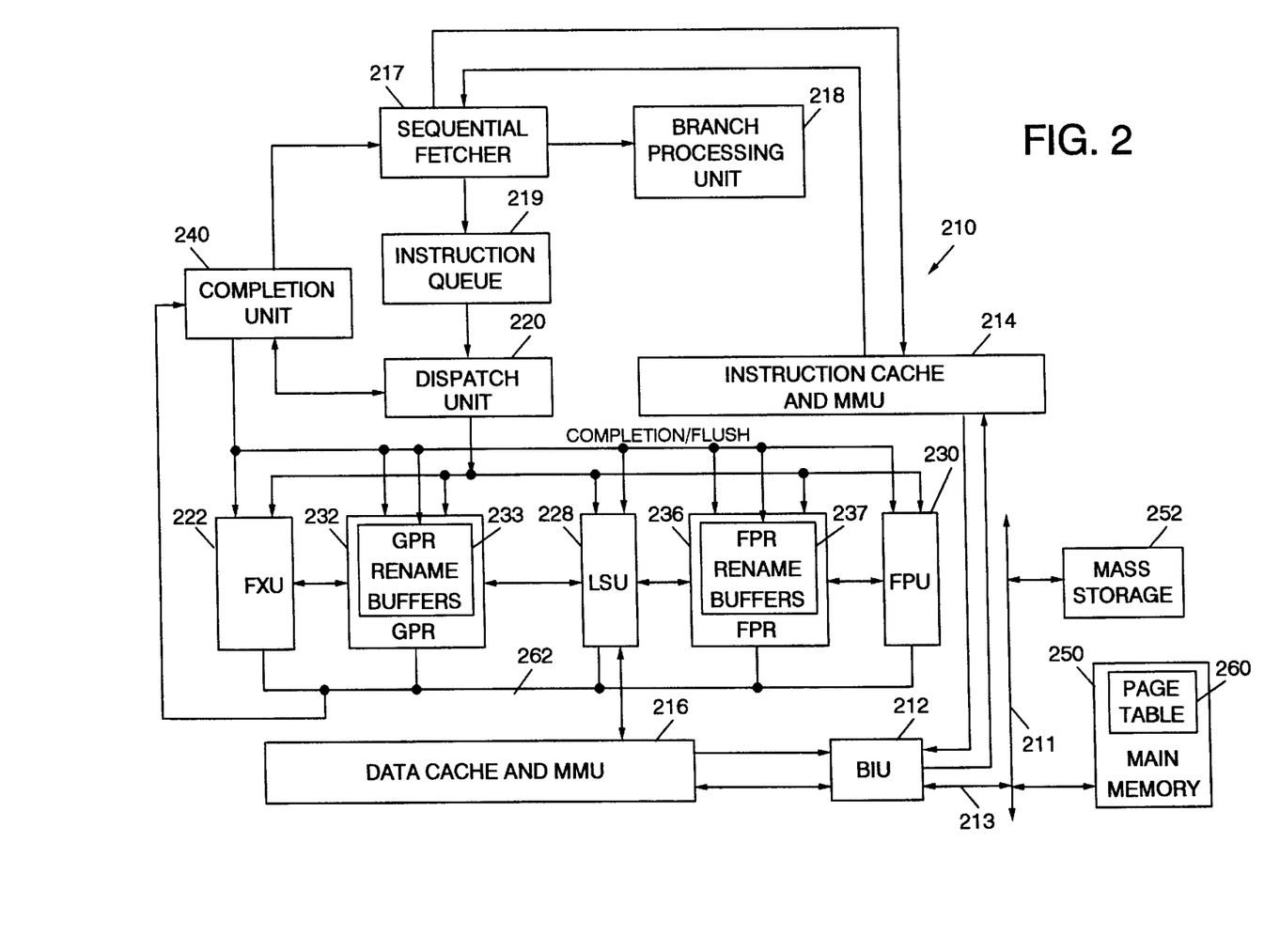
FIG. 2 illustrates a processor configurable in accordance with the present invention.

With reference now to FIG. 2, there is depicted a block diagram of an illustrative embodiment of a data processing system for processing information in accordance with the invention recited within the appended claims. In the depicted illustrative embodiment, CPU 210 comprises a single integrated circuit superscalar microprocessor. Accordingly, as discussed further below, CPU 210 includes various execution units, registers, buffers, memories, and other functional units, which are all formed by integrated circuitry. CPU 210 is coupled to system bus 211 via bus interface unit (BIU) 212 and processor bus 213, which like system bus 211 includes address, data, and control buses. BIU 212 controls the transfer of information between processor 210 and other devices coupled to system bus 211, such as main memory (RAM) 250 and nonvolatile mass storage 252, by participating in bus arbitration. The data processing system illustrated in FIG. 2 may include other unillustrated devices coupled to system bus 211, which are not necessary for an understanding of the following description and are accordingly omitted for the sake of simplicity.

BIU 212 is connected to instruction cache and MMU (Memory Management Unit) 214 and data cache and MMU 216 within CPU 210. High-speed caches, such as those within instruction cache and MMU 214 and data cache and MMU 216, enable CPU 210 to achieve relatively fast access times to a subset of data or instructions previously transferred from main memory 250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 250. Instruction cache and MMU 214 is further coupled to sequential fetcher 217, which fetches instructions for execution from instruction cache and MMU 214 during each cycle. Sequential fetcher 217 transmits branch instructions fetched from instruction cache and MMU 214 to branch processing unit ("BPU") 218 for execution, but temporarily stores sequential instructions within instruction queue 219 for execution by other execution circuitry within CPU 210.

In the depicted illustrative embodiment, in addition to BPU 218, the execution circuitry of CPU 210 comprises multiple execution units for executing sequential instructions, including fixed-point unit ("FXU") 222, load/store unit ("LSU") 228, and floating-point unit ("FPU") 230. Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or main memory 250) into selected GPRs 232 or FPRs 236 or which store data from a selected one of GPRs 232 or FPRs 236 to memory 250.

CPU 210 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 217 retrieves one or more instructions associated with one or more memory addresses from instruction cache and MMU 214. Sequential instructions fetched from instruction cache and MMU 214 are stored by sequential fetcher 1217 within instruction queue 219. In contrast, sequential fetcher 217 removes (folds out) branch instructions from the instruction stream and forwards them to BPU 218 for execution. BPU 218 includes a branch prediction mechanism, which in one embodiment comprises a dynamic prediction mechanism such as a branch history table. That enables BPU 218 to speculatively execute unresolved conditional branch instructions by predicting whether or not the branch will be taken.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 210 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240. Instructions executed by FXU 222 and FPU 230 are completed by transferring data results of the instructions from GPR rename buffers 233 and FPR rename buffers 237 to GPRs 232 and FPRs 236, respectively.

However, in various embodiments, the invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with a target identification ("TID") generator which generates tokens, or tags, each of which is uniquely associated with an instruction upon dispatch. The TIDs are used to retain program order information and track data dependencies.

The dispatch unit 220 in the present invention not only assigns TIDs and dispatches instructions, but also updates various tables which are used to track the status of the dispatched instructions.

Completion unit 240 includes an interruptible instruction table ("IIT"), which is a first-in-first-out buffer that saves relevant information of interruptible instructions that have been dispatched but not yet completed. The interruptible instructions are instructions whose execution may cause (1) the re-dispatch of subsequent instructions that have already been dispatched, or (2) the abandonment of subsequent instructions that have already been dispatched. The CSI instructions fall into this category. Therefore, all CSI instructions are qualified for the IIT.

When the execution of an interruptible instruction causes redispatch and abandonment of subsequent instructions, then its execution "flushes" the subsequent instructions.

An interruptible instruction finishes when the processing of the instruction has passed the point that the instruction will generate an execution. A finish signal is raised by the execution unit to the instruction completion logic. An instruction is considered to be non-speculative when all prior interruptible instructions have completed. When an interruptible instruction has become non-speculative, it can be completed if its execution finished without generating any exception. For a load instruction, the point that finish is signalled can precede the actual return of data from the memory sub-system.

A non-interruptible instruction already dispatched is considered complete when all prior interruptible instructions have completed and did not flush. It is considered complete even though it has not finished execution. Instructions that require serialization are serialized by the execution units.

The present invention allows certain processor, or machine, context altering instructions or events to take place concurrently while other non-interruptible instructions are still executing. Within the following discussion, such instructions or events are further described, and are generally referred to as machine context synchronization operations.

An instruction-based interrupt is an exception that requires a service routine to handle the exception. The exception is caused by the execution of an instruction. Such an interrupt service routine in prior art processors will not start until all prior instructions have completed and load data has reached its target area.

Figure 3:
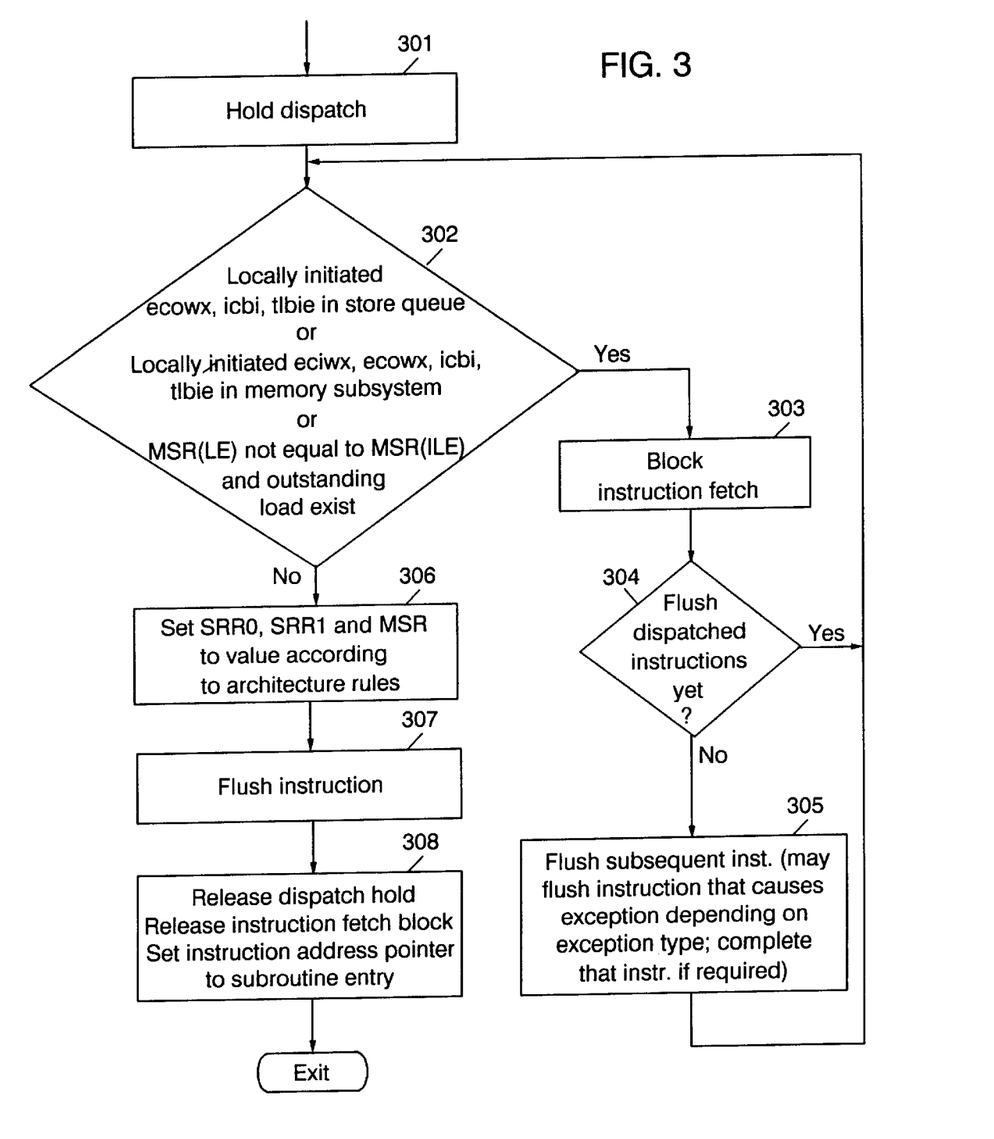
FIGS. 3–6 illustrate flow diagrams of various embodiments of the present invention.

Referring to FIG. 3, there is illustrated a flow diagram for implementing the present invention with respect to such instruction-based interrupts. The process begins with step 301 once the process has decided that a non-speculative interruptible instruction finishes with an exception, and there are no pending interrupts with a higher priority. In step 301, the control sequence blocks any new instructions from being dispatched because an interrupt service routine will start a new instruction stream.

Step 302 of the control sequence is implemented to avoid unnecessary sequentialization of a start of an interrupt service routine and allows such a routine to overlap with prior non-interruptible instructions that are still in execution. In step 302, a set of conditions are checked for prior dispatched instructions. If one of the conditions exist, the operation to start an interrupt service routine will not proceed because they will change the status under which prior dispatched instructions are assumed to execute. If none of the conditions exist, the start of the service routine can proceed in step 306, even though there are existing prior instructions in execution. Acronyms used in the following discussion refer to the Power PC architecture.

There are three conditions checked in step 302; the first two detect existing prior instructions (ecowx, eciwx) that will be effected adversely when operations to start and interrupt service routine change the context (in this case, the status of address translation) or to detect existing prior instructions (icbi, tlbie) that intend to change the context (invalidating the instruction cache and change of TLB (translation look-aside buffer) status). Because they are prior in program order relative to the exception causing instruction, the architecture definition of CSI of the exception handling must guarantee that the exception handling routine does not change the context for these instructions, and the service routine itself operates under a new context established by these instructions. The third condition guards against changes in byte ordering due to a change of the LE bit (little endian bit of the MSR) before beginning an interrupt service routine. Steps 302, 303, 304, and 305 constitute a wait loop that ensures that no prior dispatched instruction exists and meets any of the conditions. The flush in step 305 flushes all dispatched instructions after the one causing the exception. Step 303 holds off any new instruction fetch that might be effected by address translation changes.

Step 306 is the beginning of the interrupt service subroutine of the present invention. The value put in SRR0, SRR1, and MSR are specified by the PowerPC architecture rules. In prior implementations, all instructions prior to the exception causing instruction have to complete and load data must be deposited in the target register before these operations start. In the present invention, they can start as long as the conditions in step 302 do not exist. If there are prior outstanding loads, and as long as the setting of MSR does not change the byte ordering for data returning from the memory sub-systems, the operations can proceed without waiting for the load data. Since a load miss can take a long time to retrieve the data, the present invention can speed up the start of an interrupt service routine significantly.

Step 307 flushes all instructions dispatched after the exception causing instruction in case the control sequence passes step 302 without going into the wait loop. Step 308 releases the dispatch hold and restarts instruction fetching by depositing the interrupt service routine entry address to the instruction fetch pointer and releasing the instruction fetch hold.

The control sequence of the present invention with respect to a system call (SC) instruction is identical as the flow diagram in FIG. 3 except that the setting of the value in SRR0, SRR1, and MSR in step 306 is defined differently under the PowerPC architecture rules.

For non-instruction-based interrupt handling, the control sequence for the present invention is the same as described above with respect to FIG. 3. Step 302 will eliminate the need for unnecessary waiting until all prior instructions complete and load data are deposited in target registers.

Figure 4:
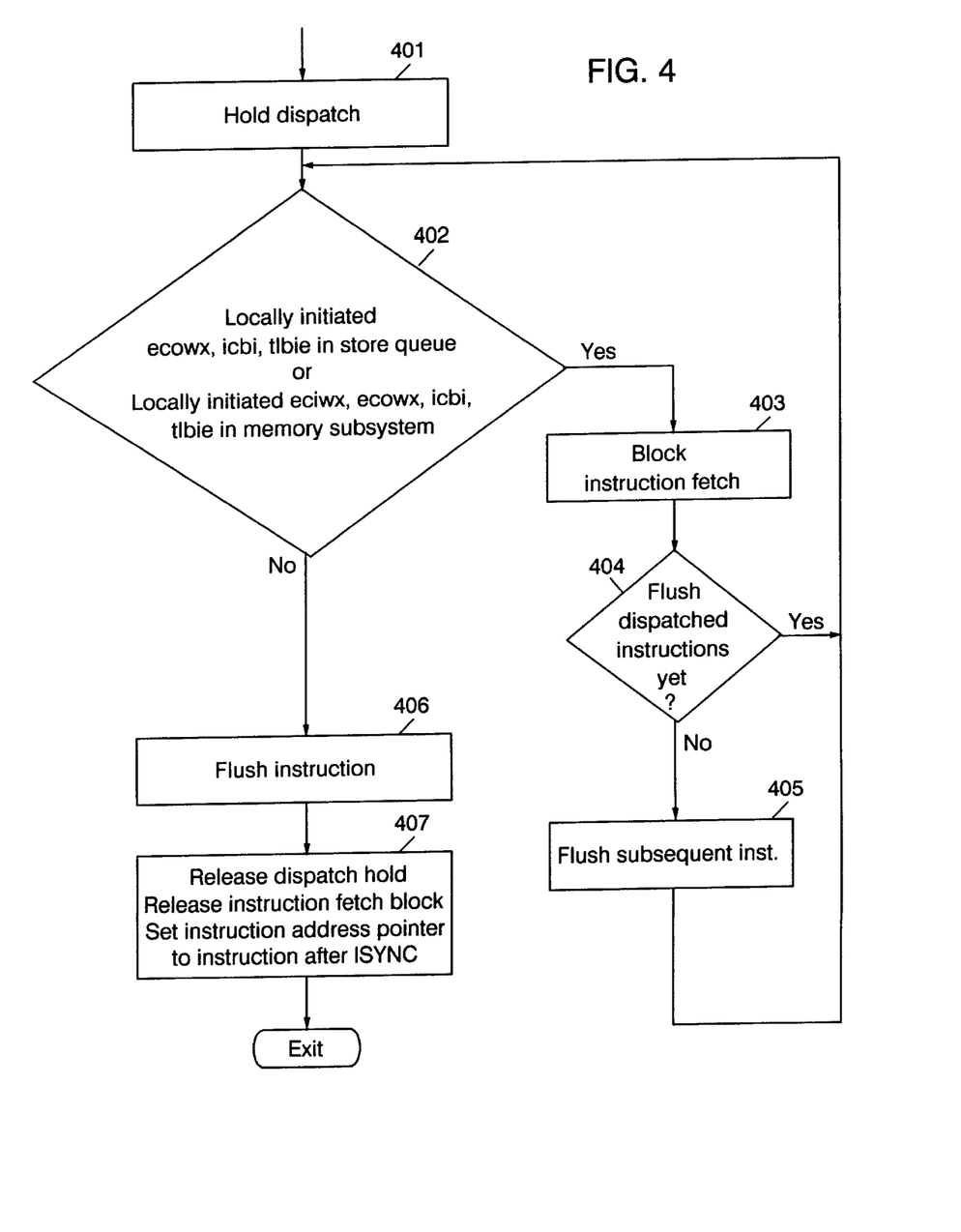

Referring next to FIG. 4, there is illustrated a flow diagram of an embodiment of the present invention for handling an ISYNC instruction. This process is very similar to that described with respect to FIG. 3 except for some minor differences. Step 402 has only two conditions to check. Because the execution of an ISYNC instruction does not change byte ordering, the third condition referenced above in step 302 does not apply. However, checking of the first two conditions described above with respect to step 302 does ensure that prior context dependent instructions are completed (ecowx, eciwx) and context changing instructions (icbi, tlbie) also are completed. The operation to execute an ISYNC construction is simple and is accomplished by observing the conditions in step 402. Once the conditions are matched and all instructions subsequent to the ISYNC instruction have been flushed, instruction fetch can restart from the instruction after the ISYNC instruction in step 407.

Figure 5:
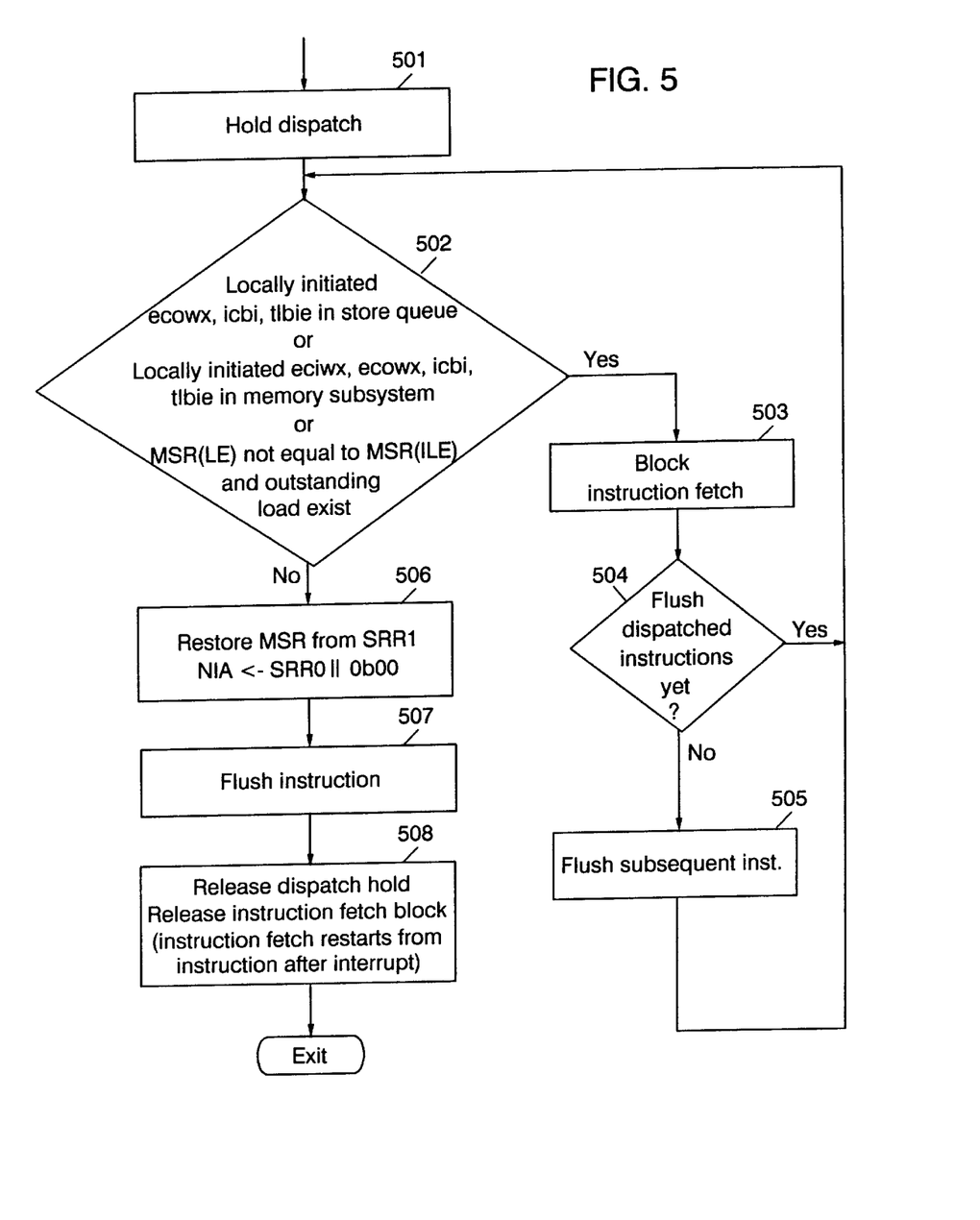

Referring next to FIG. 5, there is illustrated an embodiment of the present invention for handling an RFI (return from interrupt) instruction, which is very similar to the process described above with respect to FIG. 3. Step 305 handles many different types of instruction-based interrupts. In some of the exception types, the instruction that causes the interrupt may need to be re-executed after the exception is handled by the system. Hence, the exception-causing instruction and its subsequent instructions are flushed instead of flushing only the subsequent instruction. In such a case, the exception causing instruction is not allowed to complete normally. In steps 405 and 505, the ISYNC and RFI instructions are processed for normal completion when the machine context synchronization operations are carried out. In such cases, only the subsequent instructions are flushed.

Steps 506 and 508 are operations for executing the RFI instruction. Step 506 restores the portion of MSR register content which was saved in SRR1 register when the interrupt surface routine was entered. The address of the instruction to be executed after the exception is serviced is retrieved from the SRR0 register and deposited in the next instruction address register (NIA). It will become the instruction to be fetched and dispatched after the RFI instruction is processed. Since the RFI might change the context, step 502 precisely checks for prior instructions that would be effected by the change and ensures that any context changes initiated prior to the RFI have completed.

Figure 6:
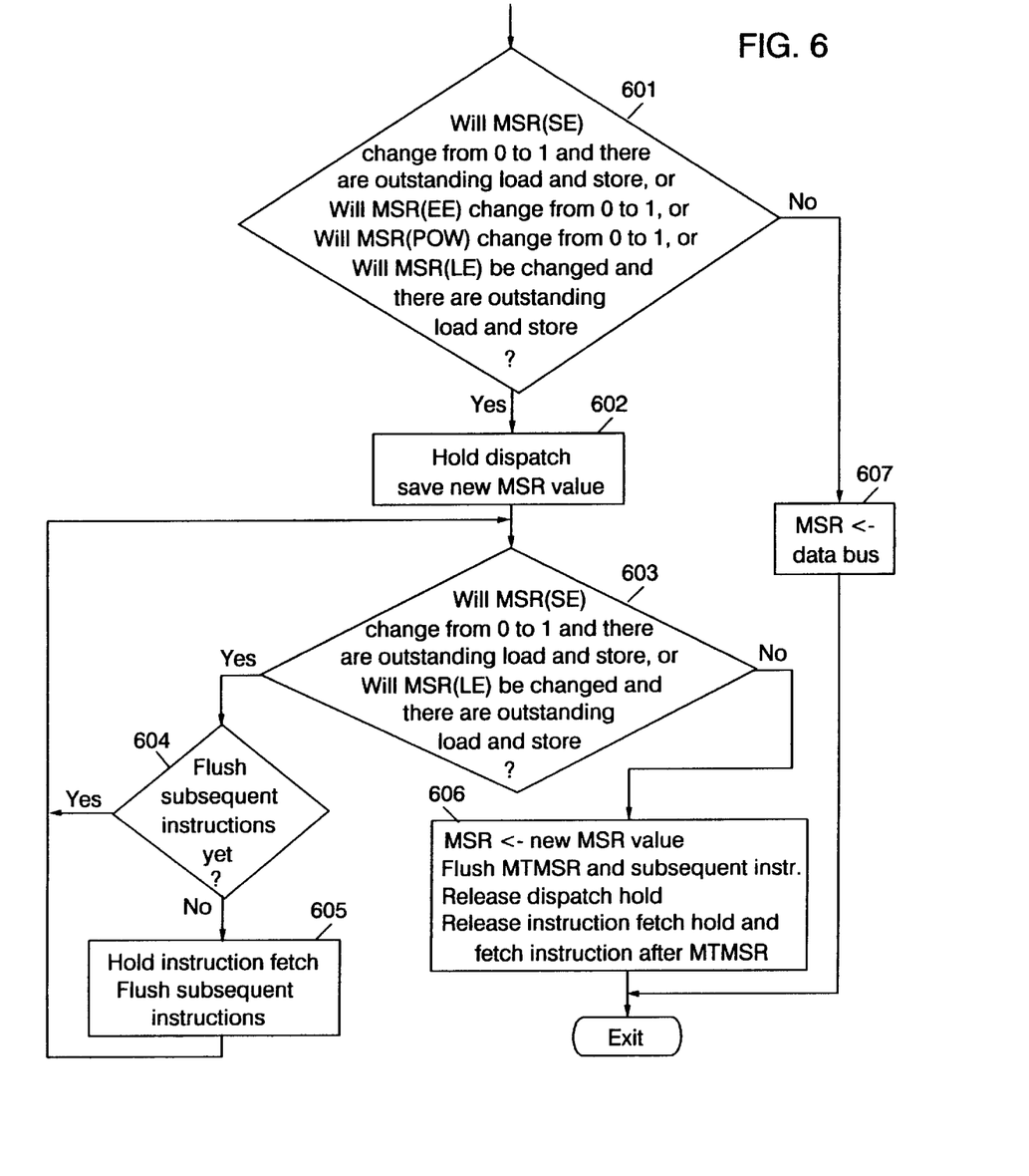

Referring next to FIG. 6, the following discussion deals with writing (move to) special purpose registers ("SPRs"). The executions of these instructions require the execution units to move data from general purpose registers to the special purpose registers. The special purpose registers have no out-of-order execution support, since only a small fraction of the program has instructions writing these registers. Therefore, the execution of writing a SPR is issued in sequential order, meaning that it is executed only when all prior instructions writing to a SPR have completed. These instructions can be CSI only if some (SE, EE, POW, LE) bits are written; therefore, the executing of such instructions generally do not require prior instructions to have data deposited in the target registers. The following are rules developed to allow the execution of these instructions to overlap with prior non-interruptible instructions.

A move to machine register ("MTMSR") instruction can change the context of the machine. The execution unit sends the new MSR value to the instruction completion logic when the MTMSR instructions becomes non-speculative and no interruptible instruction exists in the store queue (not shown). The present invention specifically checks which bits might change the context. These specific conditions are noted in step 601. If none of the conditions are met, the MTMSR instruction can proceed without even flushing subsequent instructions that are already dispatched. In such a case, the MTMSR instruction can be executed in parallel with prior non-interruptible instructions and subsequent instructions. In case any of the conditions in step 601 are determined to exist, the control sequencer holds dispatch in step 602 and saves the new MSR value.

Block 603 checks for MSR bit changes that might inadvertently affect the behavior load and store instructions that are preceding the MTMSR instruction. One such change is the SE bit of the MSR register change from 0 to 1 (single instruction trace mode is turned on) and the other change is the LE bit change that affects the byte ordering of memory words exchanged between the processor and the memory. The existence of any of the conditions will start a loop in steps 603, 604, and 605 to flush all instructions subsequent to the MTMSR instruction and wait for the condition to disappear. When such conditions are no longer detected, the control sequencer flushes the MTMSR instruction and the subsequent instructions in step 606, deposits the new MSR value into the MSR register, releases the instruction fetch blocking, releases dispatch hold, and initiates fetching of the instruction immediately after the MTSR instruction. Therefore, the path including steps 601 and 607 represents concurrent execution of the MTMSR instruction with prior non-interruptible instructions and subsequent instructions. The path including steps 601, 602, 603, and 606 represents concurrent execution of the MTMSR instruction with prior non-interruptible instructions.

MTSRR (move to SRR register) instructions are executed concurrently with prior non-interruptible instructions and subsequent instructions without any restriction under the Habanero microarchitecture for instruction completion. As the MTMSR instruction, the execution unit sends the new SRR value to the instruction completion logic when the MTMSR instruction becomes non-speculative and no interruptible instructions exist in the store queue. The MTSRR instruction does not cause flushing of the subsequent instructions (concurrent with subsequent instructions) and is executed when it becomes the next instruction to complete (concurrent with prior non-interruptible instructions).

Although the present invention and its advantages have been described in detail, it should be understood that various changes, substitutions and alterations can be made herein without departing from the spirit and scope of the invention as defined by the appended claims.

What is claimed is:

1. In a data processing system, a method for executing a machine context synchronization operation that changes a state of the system from a first state to a second state, said method comprising the steps of:

determining if there are any instructions dispatched prior to said machine context synchronization operation that depend on said first state;

if there are not any instructions dispatched prior to said machine context synchronization operation that depend on said first state, then executing said machine context synchronization operation concurrently with a non-interruptible instruction.

2. The method as recited in claim 1, wherein said non-interruptible instruction is logically prior to said machine context synchronization operation.

3. The method as recited in claim 1, wherein said machine context synchronization operation is an instruction-based interrupt.

4. The method as recited in claim 1, wherein said machine context synchronization operation is a system call.

5. The method as recited in claim 1, wherein said machine context synchronization operation is a non-instruction-based interrupt.

6. The method as recited in claim 1, wherein said machine context synchronization operation is a context synchronizing instruction.

7. The method as recited in claim 1, wherein said machine context synchronization operation is an ISYNC instruction.

8. The method as recited in claim 1, wherein said machine context synchronization operation is a return from interrupt instruction.

9. The method as recited in claim 1, wherein said machine context synchronization operation writes to a special purpose register.

10. The method as recited in claim 1, further comprising the steps:

determining if there are any prior outstanding interruptible instructions to complete; and completing said any prior outstanding interruptible instructions before executing said machine context synchronization operation.

11. The method as recited in claim 1, wherein the following step is performed previous to the determining and executing steps:

determining that said machine context synchronization operation will be executed.

12. The method as recited in claim 11, wherein the step of determining that said machine context synchronization operation will be executed further comprises the step of determining that a non-speculative interruptible instruction has finished with an exception.

13. A processor operable for executing a machine context synchronization operation that changes a state of the system from a first state to a second state, said processor comprising:

circuitry for determining if there are any instructions dispatched prior to said machine context synchronization operation that depend on said first state;

circuitry for executing said machine context synchronization operation concurrently with a non-interruptible instruction if there are not any instructions dispatched prior to said machine context synchronization operation that depend on said first state.

14. The processor as recited in claim 13, wherein said non-interruptible instruction is logically prior to said machine context synchronization operation.

15. The processor as recited in claim 13, wherein said machine context synchronization operation is an instruction-based interrupt.

16. The processor as recited in claim 13, wherein said machine context synchronization operation is a system call.

17. The processor as recited in claim 13, wherein said machine context synchronization operation is a non-instruction-based interrupt.

18. The processor as recited in claim 13, wherein said machine context synchronization operation is a context synchronizing instruction.

19. The processor as recited in claim 13, wherein said machine context synchronization operation is an ISYNC instruction.

20. The processor as recited in claim 13, wherein said machine context synchronization operation is a return from interrupt instruction.

21. The processor as recited in claim 13, wherein said machine context synchronization operation writes to a special purpose register.

22. The processor as recited in claim 13, further comprising:

circuitry for determining if there are any prior outstanding interruptible instructions to complete; and circuitry for completing said any prior outstanding interruptible instructions before executing said machine context synchronization operation.

23. The processor as recited in claim 13, further comprising:

circuitry for determining that said machine context synchronization operation will be executed.

24. The processor as recited in claim 23, wherein the circuitry for determining that said machine context synchronization operation will be executed further comprises circuitry for determining that a non-speculative interruptible instruction has finished with an exception.

* * * * *